(12) United States Patent
Ichihara

(10) Patent No.: US 6,373,880 B1
(45) Date of Patent: Apr. 16, 2002

(54) FREQUENCY MODULATION CIRCUIT

(75) Inventor: Masaki Ichihara, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/442,886

(22) Filed: Nov. 18, 1999

(30) Foreign Application Priority Data

Nov. 25, 1998 (JP) .......................................... 10-333661

(51) Int. Cl.[7] .............................................. H04L 27/30
(52) U.S. Cl. ........................ 375/141; 375/146; 370/320
(58) Field of Search .............................. 375/130, 140, 375/141, 146, 295; 370/335, 342, 441, 320

(56) References Cited

U.S. PATENT DOCUMENTS

| | | | | |
|---|---|---|---|---|
| 5,673,260 A | * | 9/1997 | Umeda et al. .............. | 370/342 |
| 5,712,869 A | * | 1/1998 | Lee et al. .................... | 375/206 |
| 5,949,814 A | * | 9/1999 | Odenwalder et al. ........ | 375/200 |
| 6,055,266 A | * | 4/2000 | Nakamura ................... | 375/206 |
| 6,097,715 A | * | 8/2000 | Ichihara ...................... | 370/342 |
| 6,163,566 A | * | 12/2000 | Shiino ........................ | 375/143 |
| 6,246,715 B1 | * | 6/2001 | Park et al. ................... | 375/146 |
| 6,298,050 B1 | * | 10/2001 | van Heeswyk et al. ..... | 370/335 |

FOREIGN PATENT DOCUMENTS

| JP | 9-298490 | 11/1997 |
|---|---|---|
| JP | 10-112695 | 4/1998 |

* cited by examiner

*Primary Examiner*—Stephen Chin
*Assistant Examiner*—Dac V. Ha
(74) *Attorney, Agent, or Firm*—Dickstein Shapiro Morin & Oshinsky LLP

(57) ABSTRACT

In scramble calculation by a complex multiplier used for a frequency spread modulation circuit of this invention, the scramble circuit can be simplified because input signals are processed as binary numbers. Other arithmetic processing operations are implemented by simple data selectors. The circuit scale can be reduced, and the process delay time can be considerably shortened.

12 Claims, 6 Drawing Sheets

FIG. 3

| POINT | LOGIC CODE | | DATA | | ROTATE AT+45° | | I,Q OUTPUT | |
|---|---|---|---|---|---|---|---|---|
| | $PN_I$ | $PN_Q$ | $X_I$ | $X_Q$ | $X_I'$ | $X_Q'$ | $I_{OUT}$ | $Q_{OUT}$ |
| A | 0 | 0 | 1 | 1 | 0 | 1 | -Q | I |
| B | 0 | 1 | 1 | -1 | 1 | 0 | I | Q |
| C | 1 | 0 | -1 | 1 | -1 | 0 | -I | -Q |
| D | 1 | 1 | -1 | -1 | 0 | -1 | Q | -I |

FREQUENCY MODULATION CIRCUIT

BACKGROUND OF THE INVENTION

1. Field of the Invention

The present invention relates to a modulation circuit using W-CDMA (Wide-band Code Division Multiple Access) as a mobile communication scheme of the next generation and, more particularly, to a frequency spread modulation circuit using multi-code transmission and prepared on the terminal side for IQ multiplex transmission.

2. Description of the Prior Art

CDMA (Code Division Multiple Access) mobile communication uses frequency spreading in which channels are discriminated on the basis of not frequencies or timings but spread codes with low correlation, unlike the conventional FDMA (Frequency Division Multiple Access or TDMA (Time Division Multiple Access). A channel discriminated by a spread code is called a code channel.

In an advanced CDMA scheme such as W-CDMA (Wide-band CDMA), a plurality of spread codes (i.e., a plurality of code channels) are assigned to one terminal to enable high-speed data transmission. This is called a multi-code.

To transmit a multi-code, a plurality of code channels are divided into two groups. After the code channels are spread, they undergo quadrature phase modulation using the sum of the first group as an I signal (in-phase signal) and the sum of the second group as a Q signal (quadrature signal). This scheme is called IQ multiplex or an IQ multiplex scheme.

Normally, before quadrature modulation, the channels are multiplied by scramble codes and randomized (hence, the above I and Q signals are not always directly used as the in-phase and quadrature signals), and the band is limited by a filter.

FIG. 1 shows a schematic view of the IQ multiplex scheme using a multi-code.

N signals DPDCH 1 to DPDCH N input from the left side represent data channels, respectively. A signal DPCCH represents a control channel. In the description of this patent, this channel is not particularly discriminated from the remaining data channels. These signals are binary signals of "0" or "1".

A frequency spread modulation circuit 301 spreads the input signals using different spread codes in units of channels and then divides them into two groups. The sums of the respective groups are obtained as I and Q signals.

The signals are scrambled and output as signals Iout and Qout. The bands of the signals Iout and Qout are limited by filters 302 and 303, respectively. After that, the signals are converted into analog signals by D/A converters 304 and 305. These analog signals undergo quadrature modulating by a quadrature modulator 308. The resultant high-frequency signal is mixed up and amplified by a transmitter 306 and output from an antenna 307.

An outline of the transmission system circuit of a terminal apparatus of the IQ multiplex scheme using a multi-code has been described above.

The arrangement of the frequency spread modulation circuit 301 of this prior art will be described with reference to FIG. 2.

FIG. 2 shows a frequency spread modulation circuit for realizing IQ multiplex using a multi-code.

Input signals represent data channels. The channels DPDCH 1 to DPDCH N and control channel DPCCH, i.e., a total of N+1 signals are input. These signals are divided into two groups. Various methods can be used to divide the channels. For example, odd-numbered data channels are put into the I group, and even-numbered data channels the Q group.

Different predetermined spread codes corresponding to the signals, respectively, are generated by spread code generation circuits 1 to 7. When both the spread codes and input signals are binary codes of 0 or 1, frequency spreading is realized by calculating exclusive ORs 8 to 14 of the input signals and spread codes.

The frequency spreading results (binary signals of 0 or 1) are input to coefficient circuits 15 to 21. When the input is a 0, the coefficient circuit outputs a predetermined positive value. When the input is at 1, the coefficient circuit outputs a predetermined negative value. The predetermined values change in units of channels. In the example shown in FIG. 2, a value A is set for all data channels, and a value G for the control channels. For a data channel, when the spread result is a 0, +A is output, and when the spread result is a 1, −A is output. For the control channel, when the spread result is a 0, +G is output, and when the spread result is a 1, −G is output. Each of the predetermined values A and G has a plurality of bits. The values are binary numbers and correspond to the transmission levels of the channels.

The values −A and −G are given by the 2's complements of the values A and G.

An adder 22 calculates the sum of the coefficient circuits (15 to 17) to which the I group belongs and outputs it as an I signal. An adder 23 calculates the sum of the coefficient circuits (18 to 21) to which the Q group belongs and outputs it as a Q signal. The I and Q signals are binary numbers with a large number of bits.

A circuit 24 is a complex multiplier which scrambles the I and Q signals to generate signals Iout and Qout. As the scramble codes, two sets of pseudo noise signals such as codes of M-sequence or Gold codes with low correlation are used. These are signals PNI and PNQ. The signals PNI and PNQ are binary codes of 0 or 1. These signals are converted into signed data signals XI and XQ of +1 or −1 by coefficient circuits 25 and 26, respectively.

The relationship between the signals PNI and PNQ and the signals XI and XQ is shown in the table of FIG. 3.

When the signal PNI is a 0, the signal XI is +1.
When the signal PNI is a 1, the signal XI is −1.
When the signal PNQ is a 0, the signal XQ is +1.
When the signal PNQ is a 1, the signal XQ is −1.

The relationships between the inputs and outputs of the complex multiplier 24 are represented by $$I_{out} + j \cdot Q_{out} = (I + j \cdot Q) \cdot (X_I + j \cdot X_Q) \quad (1)$$

$$= (I \cdot X_I - Q \cdot X_Q) + j \cdot (I \cdot X_Q + Q \cdot X_I)$$

$$\therefore I_{out} = I \cdot X_I - Q \cdot X_Q$$

$$Q_{out} = I \cdot X + Q \cdot X_I$$

Multipliers 27, 28, 29, and 30 and adders 31 and 32 in the complex multiplier 24 faithfully execute the above equations.

The signals are scrambled in this way to generate the signals Iout and Qout.

The subsequent processing has been described above with reference to FIG. 1.

The conventional frequency spread modulation circuit for realizing IQ multiplex using a multi-code has been described above.

In principle, the above-described arrangement poses no problem. However, since the I and Q signals have a relatively large number of bits, the multipliers 27, 28, 29, and 30 and adders 31 and 32 in the arrangement based on the principle become complex, and the processing time increases.

SUMMARY OF THE INVENTION

The present invention has been made in consideration of the above situation of the prior art, and has as its object to provide a frequency spread modulation circuit which can reduce the circuit scale and shorten the delay time y simplifying the scramble circuit in a complex multiplier and has the same function as that of the conventional circuit.

In order to achieve the above object, according to the first aspect of the present invention, there is provided a frequency spread modulation circuit for performing frequency spreading using a plurality of spread codes, comprising a first input signal group (I signal group) having one or a plurality of input signals, a second input signal group (Q signal group) having one or a plurality of input signals, a first multiplication circuit group having a plurality of multiplication circuits for spreading the input signals belonging to the first input signal group using different spread codes, respectively, a first coefficient circuit group having a plurality of coefficient circuits for outputting predetermined values in accordance with outputs from the first multiplication circuit group, a first addition circuit for adding outputs from the first coefficient circuit group to generate an output signal (I signal) of the first input signal group, a second multiplication circuit group having a plurality of multiplication circuits for spreading the input signals belonging to the second input signal group using different spread codes, respectively, a second coefficient circuit group having a plurality of coefficient circuits for outputting predetermined values in accordance with outputs from the second multiplication circuit group, a second addition circuit for adding outputs from the second coefficient circuit group to generate an output signal (Q signal) of the second input signal group, a logic circuit for separately receiving a plurality of random signals for scrambling and processing the random signals together to generate first, second, and third control signals, and a switch circuit for controlling polarities of the spread codes used in the first input signal group in accordance with the first control signal, controlling polarities of the spread codes used in the second input signal group in accordance with the second control signal, and outputting the I signal as the output from the first addition circuit and the Q signal as the output from the second addition circuit directly or after exchange in accordance with the third control signal.

In order to achieve the above object, according to the second aspect of the present invention, there is provided a frequency spread modulation circuit for performing frequency spreading using a plurality of spread codes, comprising a first input signal group (I signal group) having one or a plurality of input signals, a second input signal group (Q signal group) having one or a plurality of data channels, a first multiplication circuit group having a plurality of multiplication circuits for spreading the input signals belonging to the first input signal group using different spread codes, respectively, a first coefficient circuit group having a plurality of coefficient circuits for outputting predetermined values in accordance with outputs from the first multiplication circuit group, a first addition circuit for adding outputs from the first coefficient circuit group to generate an output signal (I signal) of the first input signal group, a second multiplication circuit group having a plurality of multiplication circuits for spreading the input signals belonging to the second input signal group using different spread codes, respectively, a second coefficient circuit group having a plurality of coefficient circuits for outputting predetermined values in accordance with outputs from the second multiplication circuit group, a second addition circuit for adding outputs from the second coefficient circuit group to generate an output signal (Q signal) of the second input signal group, a logic circuit for separately receiving a plurality of random signals for scrambling and processing the random signals together to generate first, second, and third control signals, and a switch circuit for controlling polarities of the spread codes used in the first input signal group in accordance with the first control signal, controlling polarities of the spread codes used in the second input signal group in accordance with the second control signal, and outputting the I signal as the output from the first addition circuit and the Q signal as the output from the second addition circuit directly or after exchange in accordance with the third control signal.

The present invention has the following secondary aspects in association with the first and/or second aspect.

In the first or second aspect, each input signal of the first and second input signal groups is a binary signal (1 or 0), and each multiplication circuit of the first and second multiplication circuit groups comprises an exclusive OR gate or an exclusive NOR gate.

The arrangement according to the first or second aspect further comprises a plurality of spread code generation circuits for spreading the input signals.

In the first or second aspect, the spread code or input signal is a binary signal (1 or 0), and the polarities are controlled by calculating an XOR of the first or second control signal and each spread code or inverting the XOR by a multiplication circuit constructed by an exclusive OR gate or an exclusive NOR gate.

In the first or second aspect, each of the coefficient circuits outputs a predetermined value when the input signal is a 1 and outputs an inverted value when the input signal is a 0, or vice versa.

The predetermined value obtained when the input signal is a 1 is a binary number comprising a plurality of bits, and the inverted value is a binary number comprising a plurality of bits obtained by calculating a 2's complement of the predetermined value.

As is apparent from the above aspects, in scramble calculation by a complex multiplier of the present invention, the input signals are processed as binary numbers. Hence, the scramble circuit can be simplified. Consequently, the circuit scale can be reduced, and the process delay time can be considerably shortened. In addition, since other arithmetic processing operations are realized by simple data selectors, both the circuit scale and process delay time can be made small.

The above and many other objects, features and advantages of the present invention will become manifest to those skilled in the art upon making reference to the following detailed description and accompanying drawings in which preferred embodiments incorporating the principle of the invention are shown by way of illustrative examples.

BRIEF DESCRIPTION OF THE DRAWINGS

FIG. 3 is a table showing the relationships between signals PNI and PNQ and signals XI and XQ;

DETAILED DESCRIPTION OF THE PREFERRED EMBODIMENTS

Figure 4:
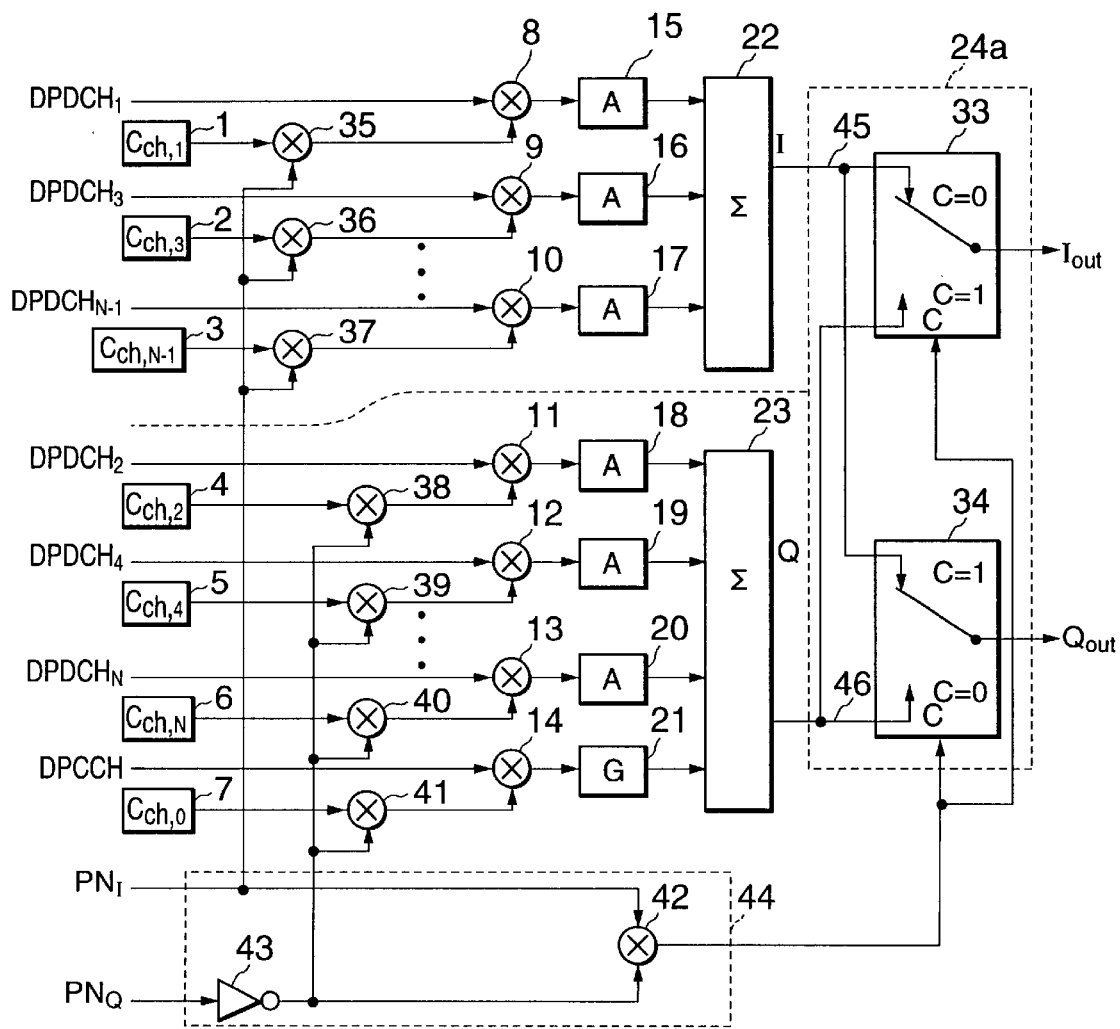
FIG. 4 is a block diagram showing the arrangement of an embodiment of the present invention.
Figure 5:
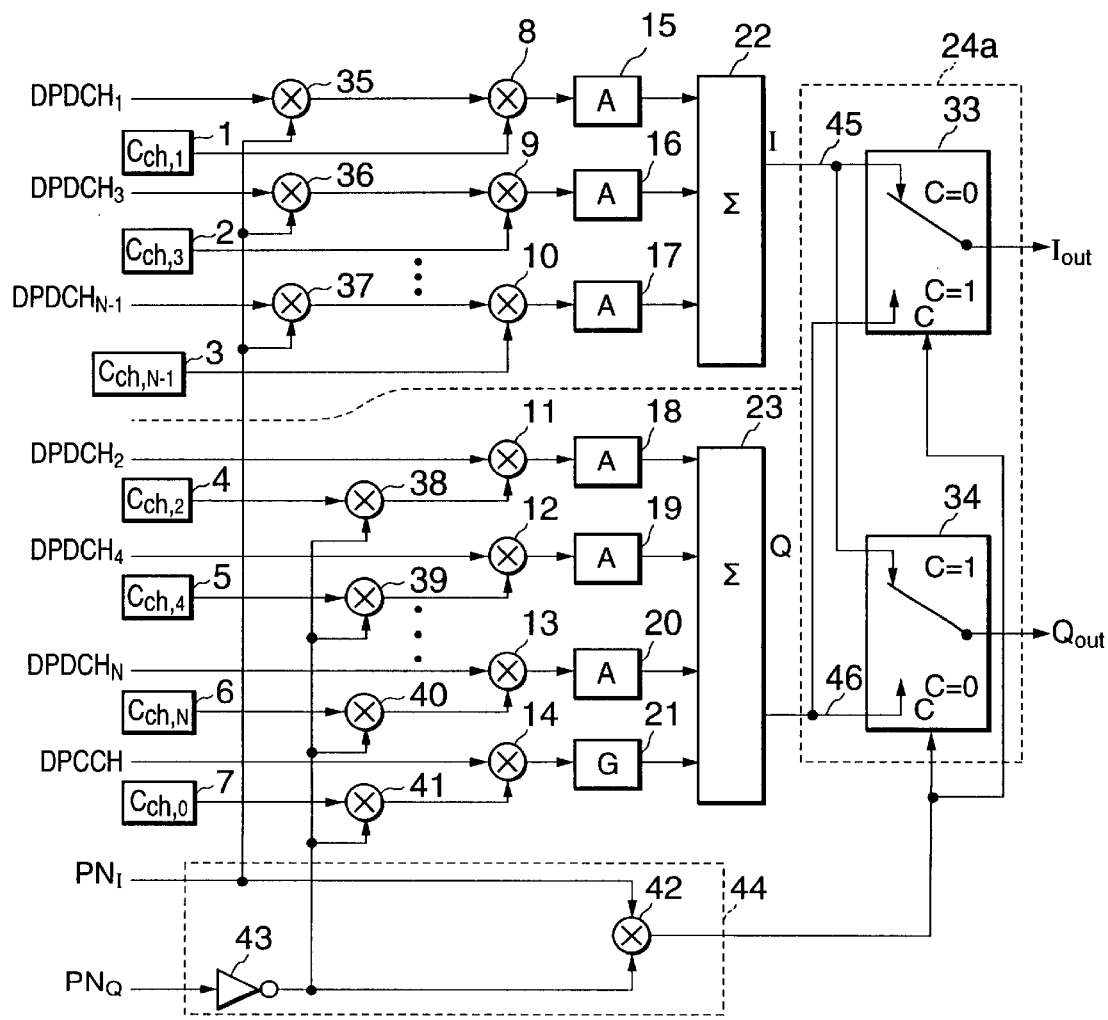
FIG. 5 is a block diagram showing the arrangement of another embodiment of the present invention.
Figure 6:
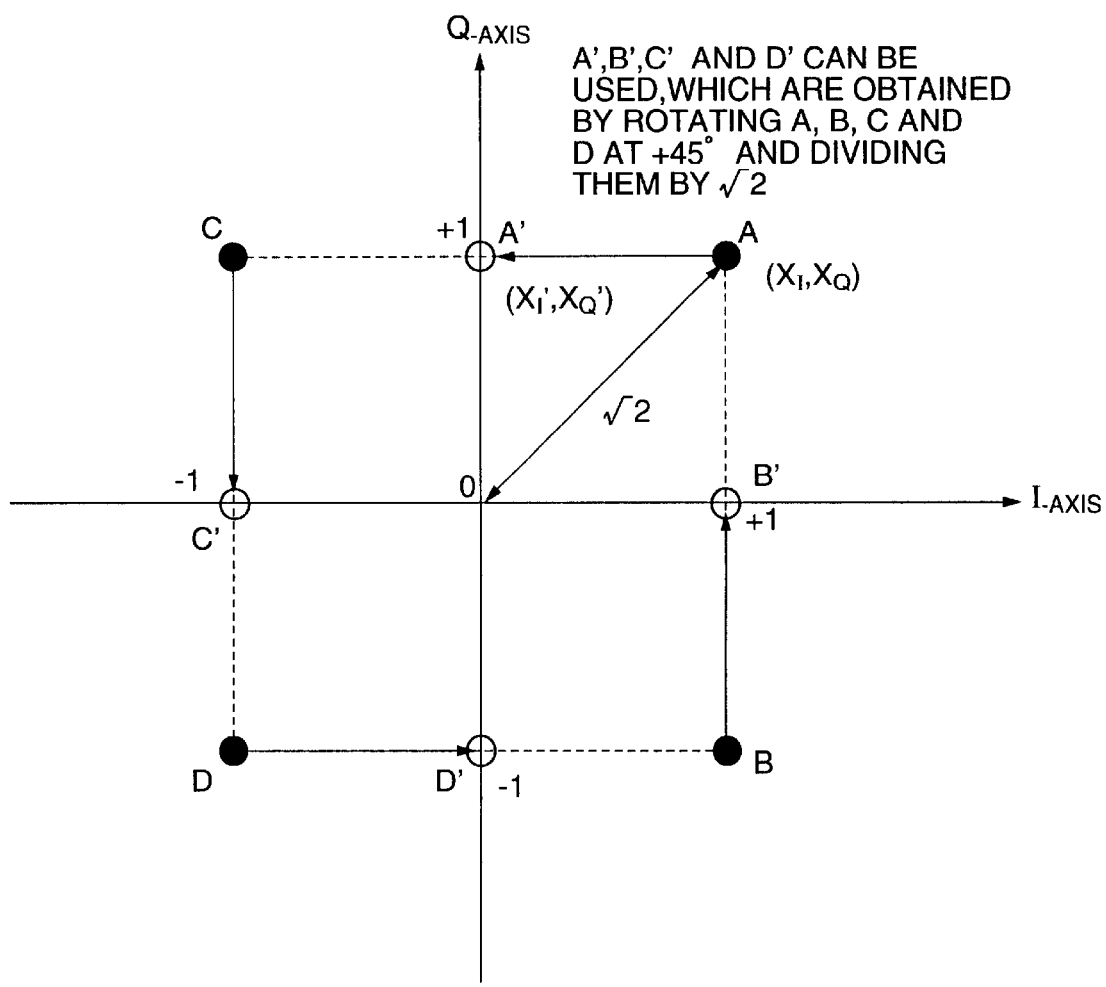
FIG. 6 is a view showing the complex vector relationship between (XI,XQ) and (X'I,X'Q).

Preferred embodiments of the present invention will be described below with reference to the accompanying drawings (FIGS. 4 to 6)

A frequency spread modulation circuit according to an embodiment of the present invention shown in FIG. 4 will be described.

Figure 1:
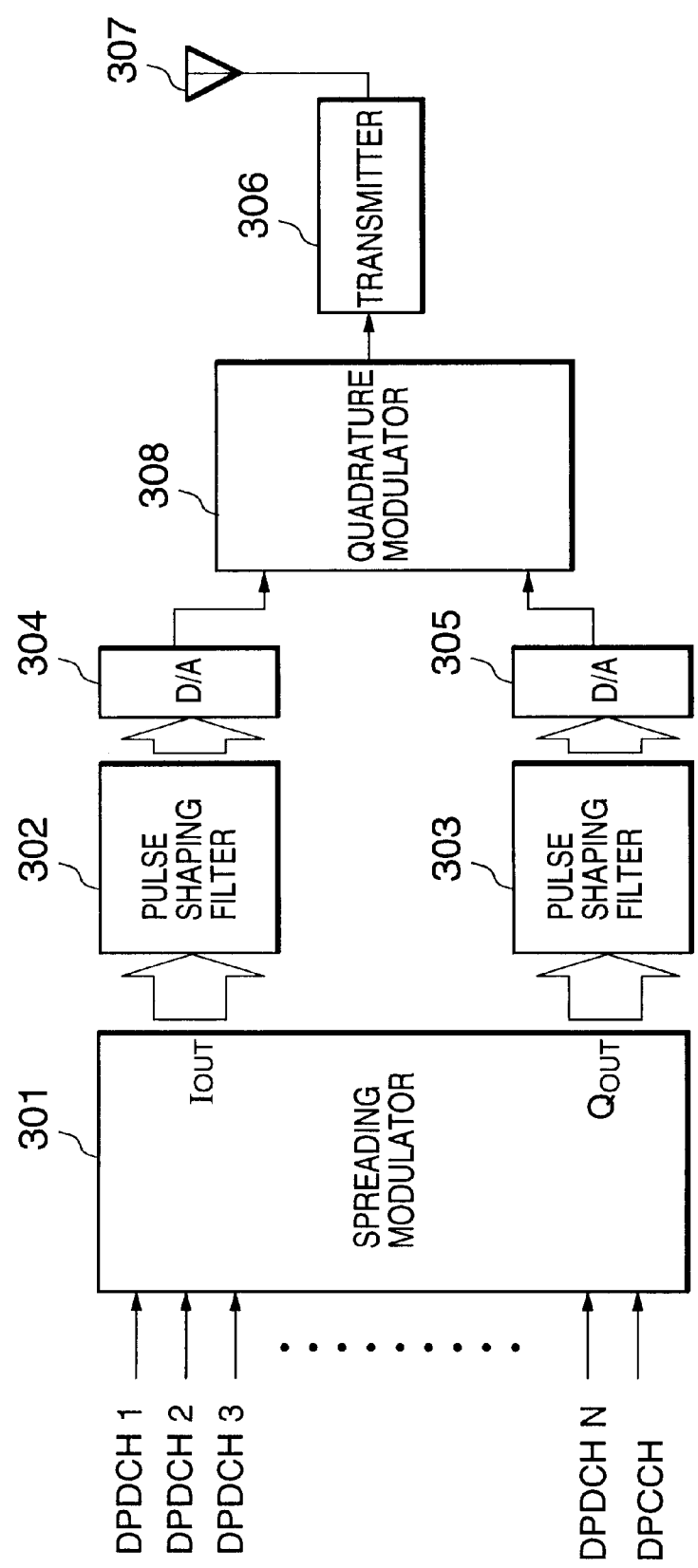
FIG. 1 is a block diagram showing the schematic arrangement of a conventional IQ multiplex scheme using a multi-code.
Figure 2:
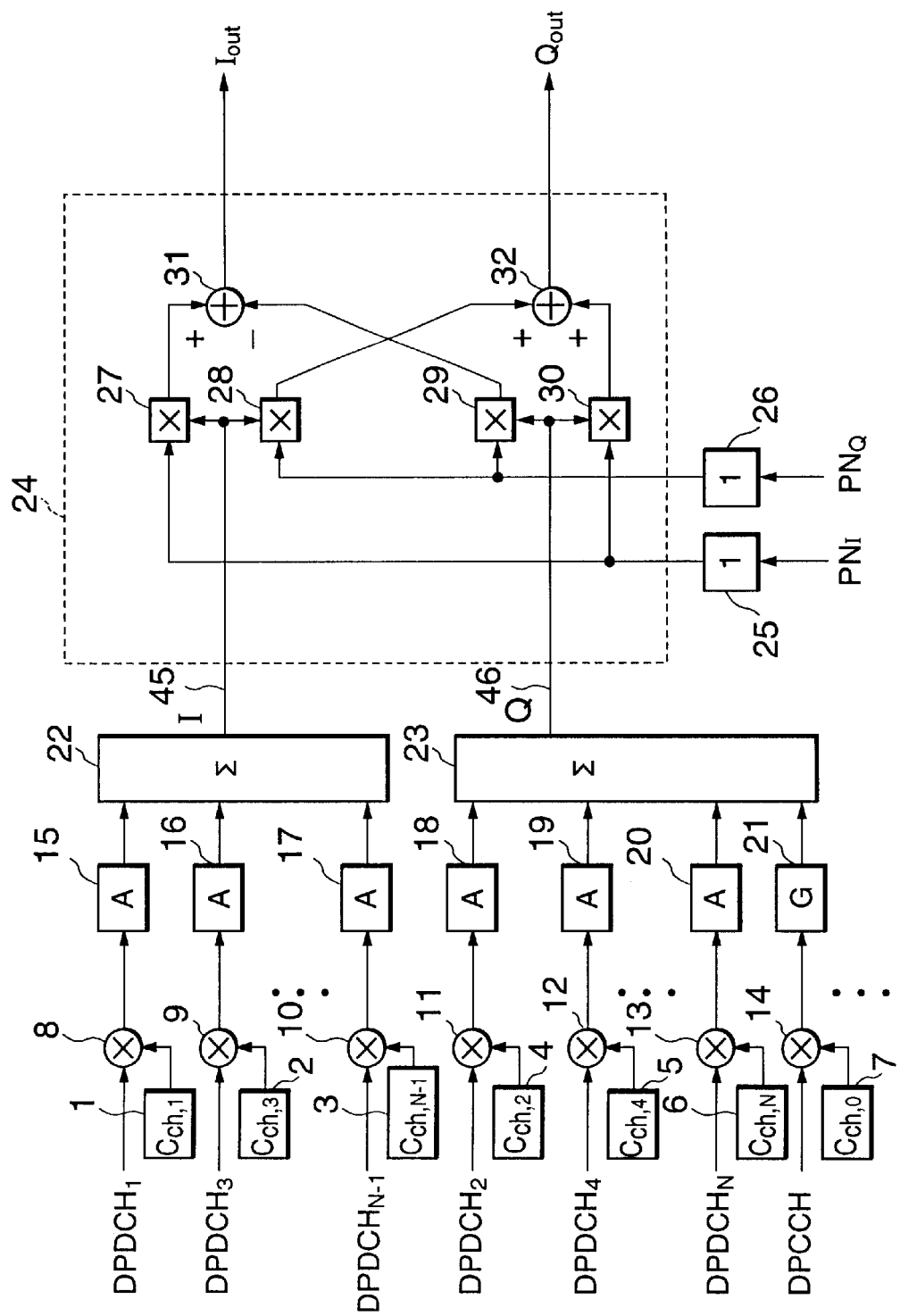
FIG. 2 is a block diagram showing the arrangement of a conventional frequency spread modulation circuit for realizing IQ multiplex using a multi-code.

In this embodiment of the present invention, the complex multiplier 24 of the conventional frequency spread modulation circuit that has already been described with reference to FIG. 2 is simplified. Many other portions are common to those of the circuit shown in FIG. 2. The same reference numerals as in FIG. 2 denote the same parts in FIG. 4, and a detailed description thereof will be omitted.

As described in detail in "DESCRIPTION OF THE PRIOR ART", the relationships between the inputs and outputs of a complex multiplier 24a are represented by $$I_{out} + j \cdot Q_{out} = (I + j \cdot Q) \cdot (X_I + j \cdot X_Q) \quad (2)$$
$$= (I \cdot X_I - Q \cdot X_Q) + j \cdot (I \cdot X_Q + Q \cdot X_I)$$
$$\therefore I_{out} = I \cdot X_I - Q \cdot X_Q$$
$$Q_{out} = I \cdot X + Q \cdot X_I$$

These relationships will be examined more closely.

In phase modulation, a fixed phase shift is the same as phase shifts due to the characteristics of an amplifier or the like and therefore can be included in them.

On the receiving side, a demodulation circuit insensitive to the phase shift is used, so a fixed phase shift poses no problem.

For this reason, signals which lead normal signals Iout and Qout by 45 degrees (=π/4 radian) can be regarded as Iout and Qout without any problems.

Hence, the signals Iout and Qout can be described by $$I_{out} + j \cdot Q_{out} = (I + j \cdot Q) \cdot (X_I + j \cdot X_Q) \cdot \frac{1+j}{2} \quad (3)$$

For $$(X_I + J \cdot X_Q) \cdot \frac{1+j}{2} = \frac{X_I - X_Q}{2} + J \cdot \frac{X_I + X_Q}{2} \quad (4)$$
$$X'_I = \frac{X_I - X_Q}{2}$$
$$X'_Q = \frac{X_I + X_Q}{2}$$

the signals PNI and PNQ, signals XI and XQ, and signals X'I and X'Q have relationships shown in the table of FIG. 3.

Especially, the complex vectors (XI,XQ) and (X'I,X'Q) have a relationship shown in FIG. 6.

More specifically, rotating the vector (XI,XQ) at +45 degrees and multiplying it by $1/\sqrt{2}$ yields the vector (X'I, X'Q). Each of the values X'I and X'Q takes one of three values +1, −1 and 0.

Thus, we have $$I_{out} = I \cdot X'_I - Q \cdot X'_Q$$
$$Q_{out} = I \cdot X'_Q + Q \cdot X' \quad (5)$$

As a result, the signals PNI and PNQ and signals Iout and Qout have the relationships shown in FIG. 3.

The followings facts can be concluded from this fact.

If the signals PNI and PNQ take the same value, the I and Q signals are replaced and output to as the signals Iout and Qout.

When the signals PNI and PNQ have different values, the I and Q signals are directly output as the signals Iout and Qout.

When the signal PNI is a 1, the polarity of the I signal is inverted, and when the signal PNQ is at 0, the polarity of the Q signal is inverted.

In the present invention, the scramble circuit in the complex multiplier 24a is simplified using this method.

FIG. 4 shows an embodiment of the present invention.

This embodiment implements the methods described in the features of the present invention:

(1) if the signals PNI and PNQ take the same value, the I and Q signals are replaced and output to as the signals Iout and Qout;

(2) when the signals PNI and PNQ have different values, the I and Q signals are directly output as the signals Iout and Qout; and (3) when the signal PNI is a 1, the polarity of the I signal is inverted, and when the signal PNQ is at 0, the polarity of the Q signal is inverted.

The process (3) is executed before signals are converted into multilevel signals through coefficient circuits 15 to 21. Only the processes (1) and (2) are performed after the signals pass through adders 22 and 23.

The process (3) is implemented by the following steps.

(a) The signals are multiplied by the spread codes of the I group after the spread codes are inverted by exclusive OR gates (XORs) 35, 36, and 37 when the signal PNI is a 0 or directly when the signal PNI is at 1.

(b) The signals are multiplied by the spread codes of the Q group after the spread codes are inverted by exclusive OR gates (XORs) 38 to 41 and inverter 43 when the signal PNQ is a 0 or directly when the signal PNQ is at 1.

The processes (1) and (2) are directly implemented by data selectors 33 and 34, inverter 43, and exclusive OR gate (XOR) 42.

The control inputs of the data selectors 33 and 34 are terminals C. The data selectors 33 and 34 are controlled by logic values input to the terminals C. When C=1, the I and Q signals are replaced. When C=0, the I and Q signals are directly output as the signals Iout and Qout.

FIG. 5 shows another embodiment of the present invention, in which the method of implementing the above-described process (3) is slightly different although the basic arrangement is the same as described above.

In the circuit shown in FIG. 4, the process (3) is implemented by executing it on spread codes. However, as shown in FIG. 5, an equivalent process can be implemented by executing the process (3) on input signals.

In this case as well, almost the same effect as in the circuit shown in FIG. 4 can be obtained.

What is claimed is:

1. A frequency spread modulation circuit for performing frequency spreading using a plurality of spread codes, comprising:

a first input signal group (I signal group) having one or a plurality of input signals;

a second input signal group (Q signal group) having one or a plurality of input signals;

a first multiplication circuit group having a plurality of multiplication circuits for spreading the input signals belonging to the first input signal group using different spread codes, respectively;

a first coefficient circuit group having a plurality of coefficient circuits for outputting predetermined values in accordance with outputs from said first multiplication circuit group;

a first addition circuit for adding outputs from said first coefficient circuit group to generate an output signal (I signal) of the first input signal group;

a second multiplication circuit group having a plurality of multiplication circuits for spreading the input signals belonging to the second input signal group using different spread codes, respectively;

a second coefficient circuit group having a plurality of coefficient circuits for outputting predetermined values in accordance with outputs from said second multiplication circuit group;

a second addition circuit for adding outputs from said second coefficient circuit group to generate an output signal (Q signal) of the second input signal group;

a logic circuit for separately receiving a plurality of random signals for scrambling and processing the random signals together to generate first, second, and third control signals; and a switch circuit for controlling polarities of the spread codes used in the first input signal group in accordance with the first control signal, controlling polarities of the spread codes used in the second input signal group in accordance with the second control signal, and outputting the I signal as the output from the first addition circuit and the Q signal as the output from the second addition circuit directly or after exchange in accordance with the third control signal.

2. A circuit according to claim 1, wherein each input signal of the first and second input signal groups is a binary signal (1 or 0), and each multiplication circuit of said first and second multiplication circuit groups comprises an exclusive OR gate or an exclusive NOR gate.

3. A circuit according to claim 2, wherein each of said coefficient circuits outputs a predetermined value when the input signal is a 1 and outputs an inverted value when the input signal is a 0, or vice versa.

4. A circuit according to claim 3, wherein the predetermined value obtained when the input signal is a 1 is a binary number comprising a plurality of bits, and the inverted value is a binary number comprising a plurality of bits obtained by calculating a 2's complement of the predetermined value.

5. A circuit according to claim 1, further comprising a plurality of spread code generation circuits for spreading the input signals.

6. A circuit according to claim 1, wherein the spread code is a binary signal (1 or 0), and the polarities are controlled by calculating an XOR of the first or second control signal and each spread code or inverting the XOR by a multiplication circuit constructed by an exclusive OR gate or an exclusive NOR gate.

7. A frequency spread modulation circuit for performing frequency spreading using a plurality of spread codes, comprising:

a first input signal group (I signal group) having one or a plurality of input signals;

a second input signal group (Q signal group) having one or a plurality of data channels;

a first multiplication circuit group having a plurality of multiplication circuits for spreading the input signals belonging to the first input signal group using different spread codes, respectively;

a first coefficient circuit group having a plurality of coefficient circuits for outputting predetermined values in accordance with outputs from said first multiplication circuit group;

a first addition circuit for adding outputs from said first coefficient circuit group to generate an output signal (I signal) of the first input signal group;

a second multiplication circuit group having a plurality of multiplication circuits for spreading the input signals belonging to the second input signal group using different spread codes, respectively;

a second coefficient circuit group having a plurality of coefficient circuits for outputting predetermined values in accordance with outputs from said second multiplication circuit group;

a second addition circuit for adding outputs from said second coefficient circuit group to generate an output signal (Q signal) of the second input signal group;

a logic circuit for separately receiving a plurality of random signals for scrambling and processing the random signals together to generate first, second, and third control signals; and a switch circuit for controlling polarities of the spread codes used in the first input signal group in accordance with the first control signal, controlling polarities of the spread codes used in the second input signal group in accordance with the second control signal, and outputting the I signal as the output from the first addition circuit and the Q signal as the output from the second addition circuit directly or after exchange in accordance with the third control signal.

8. A circuit according to claim 7, wherein each input signal of the first and second input signal groups is a binary signal (1 or 0), and each multiplication circuit of said first and second multiplication circuit groups comprises an exclusive OR gate or an exclusive NOR gate.

9. A circuit according to claim 8, wherein each of said coefficient circuits outputs a predetermined value when the input signal is a 1 and outputs an inverted value when the input signal is a 0, or vice versa.

10. A circuit according to claim 9, wherein the predetermined value obtained when the input signal is a 1 is a binary number comprising a plurality of bits, and the inverted value is a binary number comprising a plurality of bits obtained by calculating a 2's complement of the predetermined value.

11. A circuit according to claim 7, further comprising a plurality of spread code generation circuits for spreading the input signals.

12. A circuit according to claim 7, wherein the input signal is a binary signal (1 or 0), and the polarities are controlled by calculating an XOR of the first or second control signal and each spread code or inverting the XOR by a multiplication circuit constructed by an exclusive OR gate or an exclusive NOR gate.

* * * * *